Oct. 7, 1941.    A. B. NEWTON    2,258,029
REFRIGERATION CONTROL SYSTEM WITH RELATIVE HUMIDITY CONTROL
Filed July 23, 1938
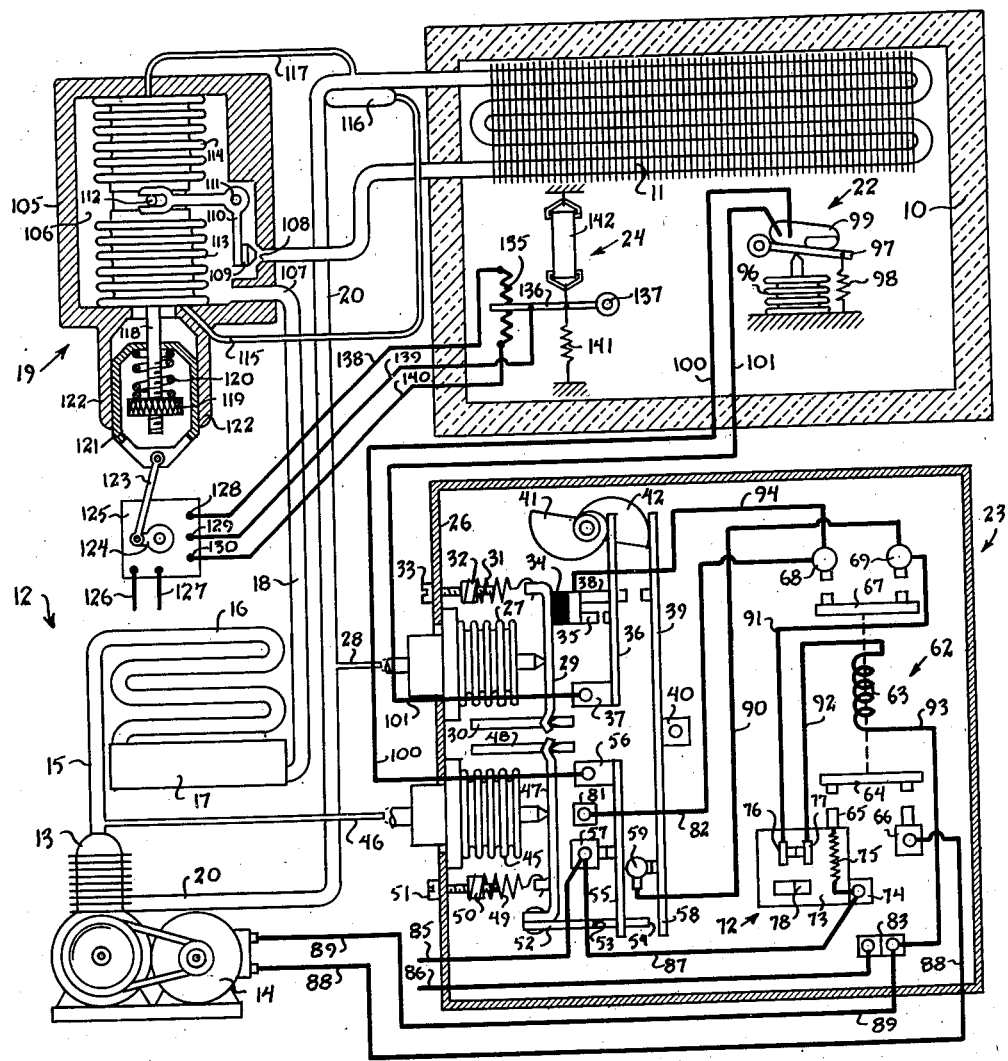
Inventor
Alvin B. Newton
By George H. Fisher
Attorney Patented Oct. 7, 1941

2,258,029

UNITED STATES PATENT OFFICE 2,258,029

REFRIGERATION CONTROL SYSTEM WITH RELATIVE HUMIDITY CONTROL

Alwin B. Newton, Minneapolis, Minn., assignor to Minneapolis-Honeywell Regulator Company, Minneapolis, Minn., a corporation of Delaware Application July 23, 1938, Serial No. 220,889

2 Claims. (Cl. 62—6)

This invention relates to refrigeration control systems in general and more particularly to a refrigeration control system provided with a relative humidity control.

In conventional refrigerating systems having a fin type evaporator for cooling a fixture or space such as a walk-in box, the relative humidity of the air therein is decreased below the desired value when desired dry bulb temperatures are maintained. In such a system the compressor may be controlled by a thermostat responsive to the fixture temperature and under normal load conditions with the thermostat set at, say 38° to 40°, the relative humidity within the fixture will never exceed 70% to 75% which value is too low for the satisfactory storing of perishable articles such as meat, a drying action being present. This dehumidifying action in a conventional refrigerating system is caused by the accumulation of relatively large amounts of frost on the fin type evaporator which decreases the effective cooling area thereof by filling up the space between the fins with frost. By reason of this decrease in effective cooling area the surface of the frost must be maintained at a relatively lower temperature to maintain the desired dry bulb temperature conditions within the fixture. This lower temperature of the surface of the frost which is necessary to perform the requisite cooling action condenses out moisture from the air to decrease the relative humidity thereof. This action is accumulative in that as the frost builds up the effective cooling area thereof further decreases which requires a lower temperature to maintain the desired dry bulb conditions which in turn increases the dehumidifying action thereof.

With a dry bulb temperature of, say 38° to 40°, it is often desirable to maintain the relative humidity in the fixture between 75% and 80% to store satisfactorily perishable articles which, as pointed out above, cannot be accomplished by a conventional system as outlined above. Numerous make-shift arrangements have been proposed in the past in an attempt to obtain desired relative humidity conditions such as reevaporating the moisture condensed on the evaporator and the use of defrosting fans but these arrangements have not proved entirely satisfactory and are necessarily expensive to operate.

Accordingly, the prime object of this invention is to provide an improved refrigeration control system which not only maintains desired dry bulb conditions within a fixture but also maintains desired relative humidity conditions without the use of expansive auxiliary equipment.

In carrying out this object of this invention, it is contemplated to utilize, first, a refrigeration control system wherein the compressor is intermittently controlled by a thermostat to maintain desired temperature conditions in the fixture and wherein defrosting of the evaporator is accomplished periodically to prevent the building up of frost on the evaporator whereby the evaporator operates at a relatively high temperature which decreases the dehumidifying action thereof to a minimum. Although this portion of the invention may be carried out in any number of ways, I propose utilizing a refrigeration control system of the type illustrated in application Serial No. 196,447, filed by Albert L. Judson and Carl G. Kronmiller on March 17, 1938. This control arrangement when operated in conjunction with a fixture thermostat maintains desired temperatures within the fixture and also prevents frosting of the evaporator. By reason of this frost preventing action the effective cooling area of the evaporator remains large at all times whereupon it is not necessary to reduce substantially the temperature of the evaporator to maintain the temperature of the fixture within desired limits. Hence as the evaporator is maintained at higher temperatures to perform the sensible cooling the dehumidifying action of the evaporator is reduced to a minimum. It is found that with this arrangement with the thermostat set between, say 38° and 40° that the relative humidity under normal load conditions assumes values between 80% and 85% which ordinarily is satisfactory but which under some circumstances may be too high for the satisfactory storing of some perishable articles.

This invention therefore comprehends, secondly, the use of a refrigeration control system outlined immediately above in combination with a control arrangement responsive to the relative humidity of the fixture for increasing a desired amount the dehumidifying action of this control system. In other words, this invention contemplates the provision of a means for reducing the relative humidity in the fixture to the desired value, illustratively 75% to 80%. Although this second feature may be accomplished in any number of ways, it is contemplated to utilize an adjustable superheat expansion valve of the type illustrated in application Serial No. 192,818, filed by A. B. Newton on February 26, 1938. This superheat valve may be adjusted in accordance with variations in the relative humidity of the fixture to increase the superheat setting thereof as the relative humidity increases whereby the effective cooling area of the evaporator is decreased. When the effective cooling area is decreased in this manner, the temperature of the effective portion must be decreased to maintain the dry bulb temperature conditions of the fixture within the desired limits and accordingly the dehumidifying action of the effective portion of the evaporator is increased. Desired relative humidity conditions are therefore maintained within the fixture at all times as well as desired dry bulb temperature conditions.

Accordingly, a more specific object of this invention is to provide a control system for a refrigerating apparatus wherein the refrigerating apparatus is thermostatically controlled to maintain desired temperature conditions within a fixture or space, wherein the evaporator is intermittently defrosted to prevent the formation of frost thereon which allows the evaporator to operate at higher temperatures to reduce to a minimum the latent heat removal and wherein the evaporator temperature may be controlled in accordance with relative humidity conditions to maintain the relative humidity in the fixture or space within desired limits while also maintaining desired temperature conditions therein.

Other objects and advantages will become apparent to those skilled in the art upon reference to the accompanying specification, claims, and drawing.

For a more thorough understanding of the invention, reference is made to the accompanying drawing in which is diagrammatically illustrated the preferred form of this invention.

For purposes of illustration the fixture or space, the temperature and relative humidity of which is to be controlled, is shown to be a walk-in box 10. The walk-in box 10 is cooled by an evaporator which is shown for purposes of illustration to be a fin type evaporator 11. Refrigerant is supplied to and withdrawn from the evaporator 11 by means of refrigerating apparatus generally designated at 12. This refrigerating apparatus may comprise a compressor 13 operated by an electric motor 14. Refrigerant is compressed in the compressor 13 and passes through a high pressure line 15 to a condenser 16 wherein it is condensed. The condensed refrigerant flows through a receiver 17, a liquid line 18, and an expansion valve generally designated at 19 to the evaporator 11. Expanded refrigerant is withdrawn from the evaporator 11 through a suction line 20 by the compressor 13. Accordingly, when the refrigerating apparatus 12 is placed in operation the evaporator 11 causes cooling of the fixture 10.

A temperature responsive controller generally designated at 22 responds to the temperature of the air within the fixture 10 and operates to control the refrigerating apparatus 12 to maintain the temperature within the fixture within predetermined limits. A unitary control arrangement generally designated at 23 which may be of the type shown and described in the above referred to Judson and Kronmiller application causes intermittent or periodic defrosting of the evaporator 11 to prevent the formation of frost thereon whereby the evaporator 11 operates at a relatively high temperature to maintain at a minimum the amount of latent heat removal. The expansion valve generally designated at 19 controls the supply of liquid refrigerant to the evaporator 11 and this expansion valve may be adjusted by a relative humidity responsive controller generally designated at 24. The relative humidity responsive controller 24 adjusts the expansion valve 19 to vary the superheat setting thereof which in turn varies the effective cooling surface of the evaporator 11. Since the compressor 13 operates with a constant displacement, the result is to vary the temperature of this effective cooling surface to vary the amount of latent heat removal in order to maintain the relative humidity in the fixture at the desired value.

For purposes of illustration in this application the unitary control arrangement 23 is shown to comprise a base 26 upon which is mounted a bellows 27. The bellows 27 is connected by a pipe 28 to the suction line 20 of the refrigerating apparatus. The bellows 27 operates a lever 29 fulcrumed on a fulcrum member 30 against the action of a tension spring 31. One end of the tension spring 31 is connected to the lever 29, and the other end is connected to a nut 32 screw-threadedly mounted on a screw 33. By rotating the screw 33 the tension in the spring 31 may be varied to adjust the pressure setting of this portion of the control arrangement. The lever 29 carries an insulating pad which in turn carries contacts 35 and 38. Contact 35 is adapted to engage a contact member 36 carried by a terminal 37 and contact 38 is adapted to engage a contact member 39 carried by a terminal 40. Concentrically located cams 41 and 42 engage the contact members 36 and 39 to relatively adjust the same. Upon an increase in suction pressure the contact 35 first engages the contact member 36 and then the contact 38 engages the contact member 39. Upon a decrease in suction pressure, contact 38 first disengages contact member 39 and then contact 35 disengages contact member 36. For purposes of illustration, it is assumed that contact 35 and contact member 36 engage and disengage at a suction pressure value of 15 pounds and that contact 38 and contact member 39 engage and disengage at a suction pressure value of 30 pounds.

Also mounted on the base 26 is a second bellows 45 connected by a pipe 46 to the high pressure line 15 of the refrigerating apparatus. The bellows 45 operates a lever 47 pivoted on a fulcrum member 48 against the action of a tension spring 49. One end of the tension spring 49 is connected to the lever 47 and the other end is connected to a nut 50 screw-threadedly mounted on a screw 51. By rotating the screw 51, the tension in the spring 49 is varied to adjust the pressure setting of this portion of the control arrangement. The lever 47 adjustably carries an abutment member 52 having abutments 53 and 54. The abutment 53 is adapted to engage a contact member 55 carried by a terminal 56, the contact member 55 cooperating with a contact 57. The abutment 54 is adapted to engage a contact member 58 carried by the terminal 40, the contact member 58 cooperating with a contact 59. For purposes of illustration, it is assumed that upon an increase in high pressure the abutment 54 first engages the contact member 58 at 135 pounds to cause contact member 58 to disengage contact 59 and the abutment 53 to engage contact member 55 to cause contact member 55 to disengage contact 57 at 185 pounds. Upon a decrease in high pressure contact member 55 engages contact 57 at 185 pounds and contact member 58 engages contact 59 at 135 pounds.

The unitary control arrangement 23 also includes a relay or starter generally designated at 62 which may comprise an operating coil 63 for operating bridge members 64 and 67. When the operating coil 63 is energized, the bridge member 64 is moved into engagement with contacts 65 and 66 and the bridge member 67 is moved into engagement with contacts 68 and 69. When the operating coil 63 is deenergized, the bridge members 64 and 67 are moved out of engagement with respective contacts by means of springs, gravity, or other means, not shown.

The unitary control arrangement may also include an overload cutout generally designated at 72 which may comprise a base 73, a terminal 74, and a resistance connected between the terminal 74 and the contact 65 for heating a thermostatic element upon the occurrence of an overload condition to separate contacts 76 and 77. Following an overload cutout condition, the contacts 76 and 77 may be manually reset by means of a reset lever 78. The unitary control arrangement is usually provided with a control terminal 81 connected by a conductor 82 to the contact 68 but in this form of the invention this control terminal is not utilized.

Line wires 85 and 86 leading from some source of power not shown are connected to contact 57 and to a power terminal 83, respectively. The compressor motor 14 is connected by wires 88 and 89 across the contact 66 and power terminal 83. The contact 59 is connected by a conductor 90 to the contact 69 which in turn is connected by a conductor 91 to the contact 76 of the overload cut-out. The contact 77 is connected by a conductor 92 to one end of the operating coil 63 and the other end thereof is connected by a conductor 93 to the power terminal 83. Contacts 35 and 38 are connected by a conductor 94 to the contact 68.

The temperature responsive controller 22 may comprise a bellows 96 containing a volatile fluid for operating a lever 97 against the action of an adjustable tension spring 98. Lever 97 operates a switch 99. For purposes of illustration, it is assumed that the switch 99 is closed upon an increase in temperature to 40° and is opened when the temperature decreases to 38°.

Assume now that the pressure on the high pressure side of the refrigerating apparatus is below 135 pounds to cause contact members 55 and 58 to engage their respective contacts 57 and 59, that the evaporator 11 has defrosted to cause the suction pressure to rise to 30 pounds to move the contacts 35 and 38 into engagement with their respective contact members 36 and 39, and that the temperature of the walk-in box has risen to 40° to close the switch 99. A starting circuit is thereupon completed for the relay 62 which may be traced from line wire 85 through contact 57, contact member 55, terminal 56, wire 100, switch 99, wire 101, terminal 37, contact member 36, contacts 35 and 38, contact members 39 and 58, contact 59, conductor 90, contact 69, conductor 91, contacts 76 and 77, conductor 92, operating coil 63, conductor 93, and power terminal 83 back to the line wire 86. Completion of this circuit energizes the operating coil 63 to move the bridge members 64 and 67 into engagement with their respective contacts.

Movement of the bridge member 64 into engagement with contacts 65 and 66 completes a load circuit for the compressor motor 14 which may be traced from the line wire 85 through contact 57, conductor 87, terminal 74, heater 75, contact 65, bridge member 64, contact 66, wire 88, compressor motor 14, wire 89, and power terminal 83 back to the other line wire 86. Accordingly, when the relay or starter 62 is pulled in the compressor motor 14 is placed in operation.

Movement of the bridge member 67 into engagement with the contacts 68 and 69 completes a maintaining circuit for the relay or starter which is independent of the contact members 39 and 58 and which may be traced from the line wire 85 through contact 57, contact member 55, terminal 56, wire 100, switch 99, wire 101, terminal 37, contact member 36, contact 35, conductor 94, contact 68, bridge member 67, contact 69, conductor 91, contacts 76 and 77, conductor 92, operating coil 63, conductor 93, and power terminal 83 back to the other line wire 86. Accordingly, the refrigerating apparatus is maintained in operation until either the temperature of the fixture 10 decreases to 38° or the suction pressure decreases to 15 pounds or the high pressure increases to 185 pounds. When any of these contingencies occur, the relay 62 is dropped out to stop operation of the refrigerating apparatus and the refrigerating apparatus cannot again be placed in operation until the temperature controller 22 calls for cooling, the high pressure decreases to 135 pounds, and the suction pressure rises to 30 pounds.

For purposes of illustration, it is assumed that a 30 pound suction pressure can only occur after the evaporator 11 has defrosted and therefore the refrigerating apparatus cannot be placed in operation until the evaporator has defrosted. The switching mechanism of the unitary control arrangement operated by the suction pressure bellows 27 therefore is operated in accordance with a condition indicative of evaporator temperature. Since the refrigerating apparatus cannot be placed in operation until the evaporator 11 has defrosted, the continued building up of frost on the evaporator is prevented and therefore the evaporator will perform its cooling function while operating at a relatively high temperature which decreases the amount of moisture taken out of the air within the fixture 10. In other words, by utilizing the unitary control arrangement 23 in conjunction with the temperature responsive controller 22, desired temperatures are maintained within the fixture 10 and the amount of latent heat removal is maintained at a minimum. By utilizing this arrangement, it is found that under normal load conditions it is possible to obtain a relative humidity in the fixture between 80% and 85% which, as pointed out above, could not be obtained by the conventional refrigerating systems. Accordingly, this control arrangement will maintain relative humidity conditions within the fixture which are satisfactory for storing perishable articles but under some circumstances this relative humidity may be excessive wherein it is desirable to maintain the relative humidity between 75% and 80%.

Since an excessive relative humidity may be obtained by the combined thermostatic and defrosting control arrangement outlined above, it is therefore possible to increase the amount of latent heat removal and control this increase in accordance with relative humidity to maintain any desired relative humidity within the fixture 10. Although this may be accomplished in any number of ways, I have shown for purposes of illustration an adjustable expansion valve of the constant superheat type controlled by the relative humidity controller 24. This expansion valve 19 may be of the type shown and described in the above referred to Newton application, and for purposes of illustration in this application it is shown to comprise a casing 105 having a chamber 106. Liquid refrigerant enters the chamber 106 through a passage 107 and discharges from the chamber 106 through an outlet valve seat 108. The discharge of liquid from the chamber 106 to the evaporator 11 is controlled by a valve 109 carried by a bell-crank lever 110 pivoted at 111. The bell-crank lever is adjustably positioned by a pin 112 which in turn is carried by a partition between two bellows 113 and 114. The bellows 113 contains a volatile fluid and is connected by a capillary tube 115 to a bulb 116 located adjacent the discharge side of the evaporator 11. Upon an increase in temperature of the refrigerant leaving the evaporator 11, the bellows 113 is expanded to move the pin 112 upwardly to admit more refrigerant to the evaporator 11. The bellows 114 is connected by a pipe 117 to the discharge side of the evaporator 11 so that the bellows 114 is operated in accordance with variations in pressure existing within the evaporator 11. Upon an increase in pressure, the bellows 114 moves the pin 112 downwardly to decrease the supply of refrigerant to the evaporator 11. The temperature bellows 113 and the pressure bellows 114 operate against each other to maintain a desired temperature and pressure condition at the outlet side of the evaporator 11. A rod 118 carried by the partition between the bellows 113 and 114 is provided with a nut 119. One end of a compression spring 120 engages the nut 119 and the other end thereof engages a crosshead 121 slidably mounted in guides 122. The compression spring 120 urges the rod 118 downwardly and hence the pin 112 downwardly to assist the pressure bellows 114. By adjusting the compression in the compression spring 120 the superheat setting of the expansion valve 19 may be adjusted at will which will vary the portion of the evaporator area required to produce the required superheat. The temperature of the evaporator is further affected at the higher superheat values by the temperature being maintained in the fixture. Thus if the fixture temperature is 38° and the superheat setting is 20°, it is obvious that the evaporator temperature must be below 18° in order to produce 20° of superheat. The amount of refrigerant in the evaporator will accordingly be controlled by the temperature of the fixture and the superheat setting of the expansion valve and hence the effective cooling area will be regulated by these conditions. By moving the crosshead 121 downwardly the spring 120 becomes more effective to increase the superheat setting of the valve 19 which decreases the effective cooling area of the evaporator 11. Conversely, upward movement of the crosshead 121 decreases the compression in the spring 120 and lowers the superheat setting of the valve 19 to increase the effective cooling area of the evaporator 11.

The crosshead 121 may be operated through a pitman 123 and a crank arm 124 by a proportioning motor 125 which may be of the type shown and described in Patent 2,028,110 granted to D. G. Taylor on January 14, 1936. Power may be supplied to the proportioning motor 125 by means of wires 126 and 127 leading from some source of power not shown. Proportioning motor 125 may be provided with control terminals 128, 129, and 130 for controlling the direction and extent of movement thereof.

The relative humidity responsive controller 24 may include a potentiometer resistance element 135 and a slider 136 pivoted at 137. The resistance element 135 and the slider 136 are connected by wires 138, 139, and 140 to the control terminals 128, 129, and 130 of the proportioning motor 125. A tension spring 141 urges the slider 136 downwardly and the slider 136 is moved upwardly by a humidity responsive device 142 upon a decrease in relative humidity. Accordingly, the slider 136 is moved with respect to the resistance element 135 upon changes in relative humidity within the fixture 10. Upon an increase in relative humidity, the slider 136 is moved downwardly to operate the proportioning motor 125 in a direction to move the crosshead 121 downwardly. Upon a decrease in relative humidity, the slider 136 moves upwardly to operate the proportioning motor 125 in a direction to move the crosshead 121 upwardly. Accordingly, as the relative humidity in the fixture 10 increases, the superheat setting of the expansion valve 19 is increased to decrease the amount of refrigerant in the evaporator 11 and hence decrease the effective cooling area thereof. Upon a decrease in relative humidity within the fixture 10, the superheat setting of the expansion valve 19 is decreased to increase the amount of refrigerant in evaporator 11 and hence to increase the effective cooling area thereof. In other words, the effective cooling area of the evaporator 11 is adjusted by variations in relative humidity within the fixture 10.

Assume now that the relative humidity within the fixture 10 rises, the effective cooling area of the evaporator 11 is decreased so that the cooling action of the evaporator 11 is decreased. Since the displacement of the compressor 13 remains constant and since the effective cooling area of the evaporator 11 is decreased, that portion of the evaporator containing refrigerant will operate at a lower temperature thereby condensing out more of the moisture in the air. In this manner the moisture content of the air is reduced to reduce the relative humidity thereof to the desired value. Conversely, upon a decrease in relative humidity within the fixture 10, the effective cooling area of the evaporator 11 is increased and since the capacity of the compressor 13 remains constant the evaporator 11 will operate at a higher temperature to decrease the amount of latent heat removal and allow the relative humidity in the fixture to rise. In this manner not only is the temperature of the fixture maintained at the desired value but also the relative humidity is maintained at the desired value by controlling the proportion of latent and sensible heat removal.

Although for purposes of illustration the principles of this invention have been disclosed as applied to a single fixture arrangement, it is readily apparent that the principles of operation of this invention may equally as well be applied to a multiple fixture arrangement wherein a thermostat in each fixture is arranged in parallel for operating the compressor in conjunction with the unitary control arrangement, wherein the thermostats in the fixtures control the solenoid valves in the liquid lines leading to their respective fixtures, wherein each fixture may be provided with an adjustable superheat expansion valve, and wherein a humidostat responsive to the relative humidity in each fixture controls the superheat setting of its associated superheat expansion valve. With such an arrangement, exactly the same operation would be obtained in a multiple fixture arrangement as is obtained in the single fixture arrangement as illustrated in this application.

Although for purposes of illustration one form of this invention has been disclosed, other forms thereof may become apparent to those skilled in the art upon reference to this disclosure and therefore this invention is to be limited only by the scope of the appended claims and prior art.

I claim as my invention:

1. In a control system for a refrigerating apparatus having evaporator means for cooling a space in which are stored perishable articles which require high relative humidity conditions and relatively low temperature conditions for satisfactory preservation of the same and also having means for circulating refrigerant at below freezing temperatures through the evaporator means, the combination of, means responsive to variations in space temperature for controlling the circulation of refrigerant through the evaporator means at below freezing temperatures to maintain a temperature in the space not exceeding 40° F. necessary for the satisfactory preservation of the perishable articles, means for defrosting periodically at sufficiently frequent intervals the evaporator means to prevent accumulation of frost on the evaporator means to allow the evaporator means to operate at the highest possible temperature in cooling the space whereby the removal of latent heat thereby is reduced to a minimum to allow relative humidity conditions to exist in the space which are too high for the satisfactory preservation of the perishable articles, and means including means responsive to the relative humidity in the space for progressively varying the effective cooling area of the evaporator means in a manner to progressively decrease the effective cooling area as the relative humidity of the space progressively increases above approximately 75%, the temperature of the effective cooling area decreasing and the removal of latent heat increasing as the effective cooling area is decreased, whereby the relative humidity of the space is accurately maintained at the desired value necessary for the satisfactory preservation of the perishable articles.

2. The method of controlling a refrigerating apparatus having evaporator means for cooling a space in which are stored perishable articles which require high relative humidity conditions and relatively low temperature conditions for satisfactory preservation of the same, comprising the steps of, operating the refrigerating apparatus to cause circulation of refrigerant through the evaporator means at below freezing temperatures for cooling the space to the desired relatively low temperature value necessary for the satisfactory preservation of the perishable articles and not exceeding 40° F., defrosting periodically at sufficiently frequent intervals the evaporator means to prevent accumulation of frost on the evaporator means to allow the evaporator means to operate at the highest possible temperature in cooling the space whereby the removal of latent heat thereby is reduced to a minimum to allow relative humidity conditions to exist in the space which are too high for the satisfactory preservation of the perishable articles, and progressively decreasing the effective cooling area of the evaporator means as the relative humidity of the space increases above approximately 80%, the temperature of the effective cooling area decreasing and the removal of latent heat thereby increasing as the effective cooling area is decreased, whereby the relative humidity of the space is accurately reduced to the desired value necessary for the satisfactory preservation of the perishable articles.

ALWIN B. NEWTON.